United States Patent [19]

Yamauchi

[11] 4,456,372
[45] Jun. 26, 1984

[54] COPYING MACHINE EQUIPPED WITH A DOCUMENT DETECTING MEMBER

[75] Inventor: Kunihiro Yamauchi, Hachioji, Japan

[73] Assignee: Konishiroku Photo Industry Co., Ltd., Japan

[21] Appl. No.: 383,317

[22] Filed: May 28, 1982

[30] Foreign Application Priority Data

Jun. 19, 1981 [JP] Japan .............................. 56-89592[U]

[51] Int. Cl.³ .......................................... G03B 27/62
[52] U.S. Cl. .................................. 355/75; 355/3 SH; 355/14 SH
[58] Field of Search .............. 355/3 SH, 14 E, 14 SH, 355/68, 75; 250/557, 560, 571; 271/265

[56] References Cited

U.S. PATENT DOCUMENTS 4,189,228 2/1980 Farrell .............................. 355/75 X
4,341,460 7/1982 Kohyama ....................... 355/14 SH

*Primary Examiner*—Richard A. Wintercorn
*Attorney, Agent, or Firm*—Jordan B. Bierman; Linda Bierman

[57] ABSTRACT

A copying machine is equipped with a transparent document glass table under which a document detecting member is arranged to travel a certain path relative to a document on said document glass table, for detecting either or both the copy density and the size of a document. The detection step is carried out automatically upon movement of a platen cover downward prior to copying.

7 Claims, 10 Drawing Figures

COPYING MACHINE EQUIPPED WITH A DOCUMENT DETECTING MEMBER

BACKGROUND OF THE INVENTION

1. Field of the Invention

The present invention relates to an electrophotographic copying machine equipped with a document-detecting device that detects the density and the size of a document to be copied.

2. Description of the Prior Art

In an electrophotographic copying machine, documents with various densities and sizes are used for copying. On the conventional electrophotographic copying machine, therefore, an image density control device is provided so that the best copied image can be obtained even for the document with various density and various size and a user controls densities manually counting on his experience according to the density of the document. As for the size, on the other hand, the recording paper corresponding to the size of a document is selected by checking the size mark indicated on the cassette and the like of the mark indicated on the panel. However, such manual density adjustment is troublesome in operation and therefore, there has been proposed a copying machine wherein the density and the size of a document are automatically detected before copying and an image density is automatically controlled and a feeding paper size is automatically selected.

In the past, there has been known a method to control the density conditions from the maximum value and the minimum value of the density as a method to detect the density of a document and to control automatically an image density, as proposed by Japanese Patent Publication Laid-Open to Public Inspection No. 93834/1978, but there has been a drawback that density conditions are controlled from the rule marks alone for the document having images darker than the density of the most necessary image such as a pencil-written document with rule marks. Accordingly, like the case of Japanese Patent Publication Laid-Open to Public Inspection No. 120623/1980, there has been proposed a method to scan the document placed on the document table to make a histogram according to the density distribution of various points of the document and to adjust to the predetermined image density according to the pattern of the histogram, but the circuit structure to make the histogram is inevitably complicated.

As a conventional document size-detecting method, on the other hand, there has been known a method wherein plural sensors are arranged at fixed positions on the platen cover and a document size is detected by the output signals from such sensors, absolutely separately from the method to detect the density of the document. This method has a problem that the structure of the platen cover is complicated, which causes an increase in cost.

SUMMARY OF THE INVENTION

It is an object of the present invention to provide an electrophotographic copying machine equipped with a new document detecting device.

It is an another object of the present invention to provide an electrophotographic copying machine equipped with a new document detecting device which can simultaneously and automatically detect both the density and the size of a document.

Above objects of the present invention can be accomplished by a copying machine equipped with a transparent document glass table which has a document detecting device comprising a document detecting member arranged under said document glass table and traveling over a certain length of a path relative to a document on said document glass table.

BRIEF DESCRIPTION OF THE DRAWING

FIGS. 7 and 8 are examples of the detection devices of the present invention respectively, out of which FIG. 7 is a side view thereof and FIG. 8 is a top plan view thereof; and FIGS. 9 and 10 are another example of the detection devices of the present invention, respectively, out of which FIG. 9 is a partly sectional side view of a document size detection device and FIG. 10 is a plan view thereof.

DETAILED DESCRIPTION OF THE PREFERRED EMBODIMENTS

Figure 1:
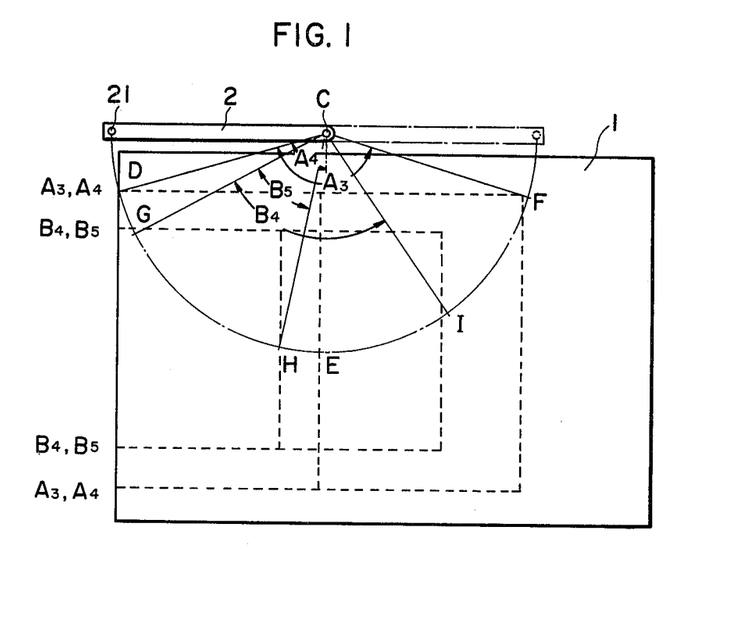
FIG. 1 is a schematic view of the operational principles of a document detecting device of the present invention.
Figure 2:
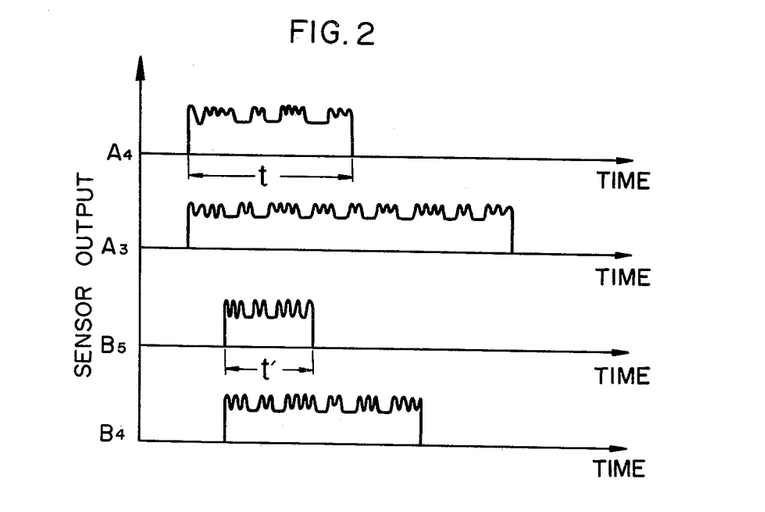
FIG. 2 is an output waveform charg of sensor bars for each document size, respectively.

FIGS. 1 and 2 illustrate the operational principles of a document detecting device of the present invention, respectively; in FIG. 1, numeral 1 is a document glass plate comprising a transparent document glass plate on which a document to be copied is placed; numeral 2 is a sensor bar that is arranged in the neighborhood of the side frame of the document glass plate 1 and under the document glass plate and is horizontally swivellable along and underneath the plane of the document glass plate 1 around fulcrum C at one end of said sensor bar 2, as indicated by an alternate long and short dash line. On the upper surface of the other end of the sensor bar 2, a sensor 21 such as a reflection type optical sensor is attached thereonto as described hereafter.

When a sensor bar 2 is swivelled after placing a document in size of B5, B4, A4, A3 or other on a given position of the document glass plate 1, the sensor bar 2 starts to detect the reflected light from the document in a size of A series (A3 or A4) at point D and completes the detection at point E (for size A4) or at point F (for size A3). As for the sizes of B series, it starts to detect the reflected light from a document at point G and completes the detection at point H (for size B5) or point I (for size B4). As the result therefrom, the output from the sensor is as shown in FIG. 2. As for A4 size of a document out of four sizes thereof, i.e., A4, A3, B5 and B4 as shown in FIG. 2, the range of the period of time t from the starting moment of swivelling sensor bar 2 corresponds to the output of the reflected light from a document (in A4 size) and the length of said time t is prescribed in accordance with the sizes of documents, and it is therefore possible to come to an operator's knowledge through the measurement of said time t. Also, the output level of the sensor varies according to the density of a document as shown in the figure. In other words, the amount of the reflected light from the portion of a character or a diagram (of which the color is usually in black) in a document is small and therefore the sensor output is small, while the amount of the reflected light from the other portion (i.e., an ordinary surface of an original document) is large, so that the sensor output therefrom becomes large. In this connection, the density of a document can be detected through the average level of the sensor output in the range of the time t.

Figure 3:
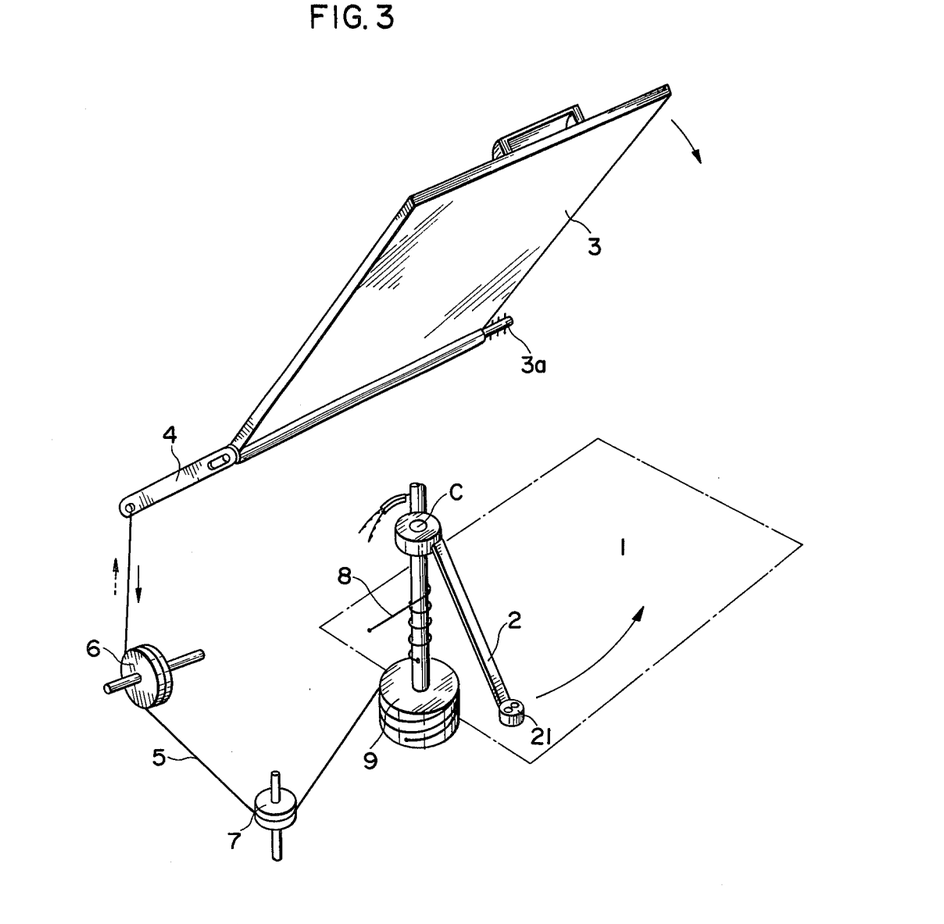
FIG. 3 is an example of the detection member driving mechanism for a document detecting device of the present invention.

FIG. 3 shows a schematic diagram of the detection member driving mechanism for a document detecting device embodied by the invention, wherein, reference numeral 3 indicates a document platen cover that swivels around the fulcrum that is shaft 3a of a side frame and lever 4 that is rotatable unitedly with said shaft 3a is fixed to an end of said shaft 3a, while an end of wire 5 is tied up with an end of said lever 4. Numerals 6 and 7 are pulleys for guiding said wire 5, respectively. The other end of said wire 5 is fixedly wound around pulley 9 that is energized clockwise by return spring 8. An end of sensor bar 2 is fixed to said pulley 9 and the fixed end thereof works as swivelling fulcrum of said sensor bar 2.

Figure 4:
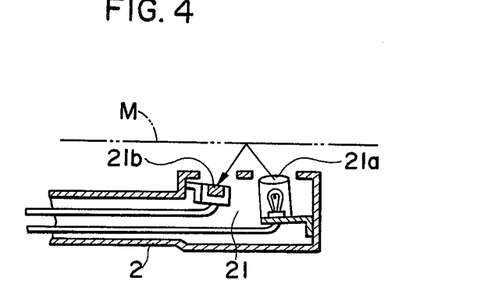
FIG. 4 is an essential portions sectional view of a sensor bar that is a detection member of FIG. 3.

FIG. 4 shows an enlarged sectional view of a sensor 21 that is provided into the end of sensor bar 2 using a reflection type optical sensor, wherein, sensor 21 comprises luminous lamp 21a and photoreceptor 21b, and a light irradiated from the luminous lamp 21a is reflected by document M (that is shown by an alternate long and two short dashes line) to be received by photoreceptor 21b and thus it is taken out in the form of an electric output.

Figure 5:
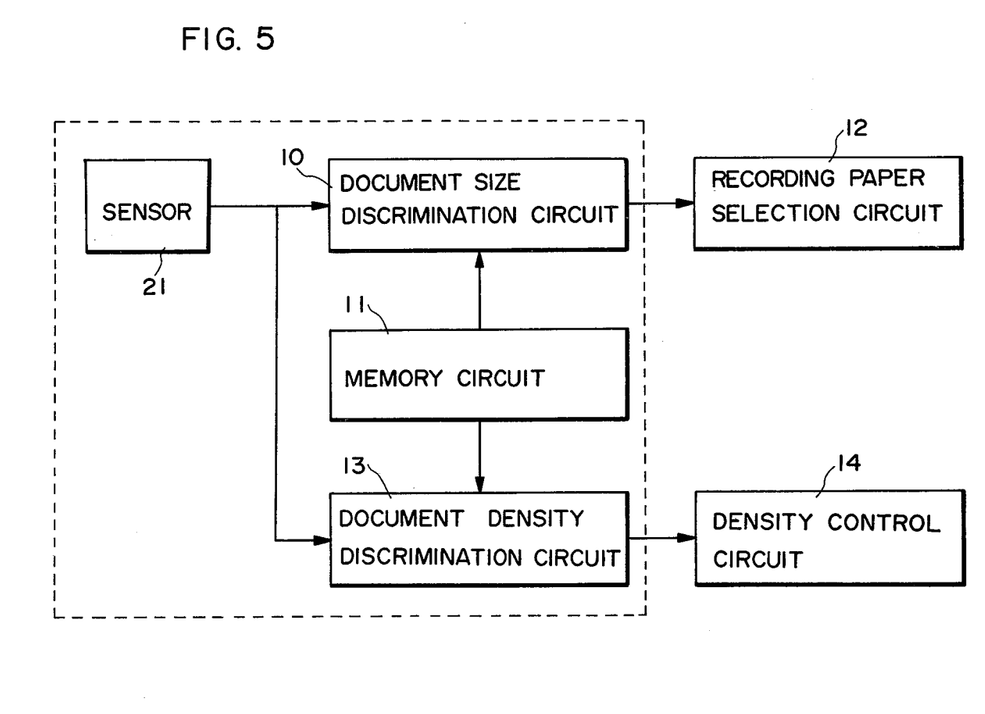
FIG. 5 is an electric circuit diagram for a document detecting device of the present invention.

FIG. 5 illustrates a detection circuit for a document detecting device of the present invention, wherein numeral 21 is a sensor; 10 is a document size discrimination circuit for discriminating a document size by comparing the output from sensor 21 with the datum of the document size having been memorized in memory circuit 11; numeral 12 is a recording paper selection circuit for selecting a proper recording paper size by means of the output from said document size discrimination circuit; numeral 13 is a document density discrimination circuit for discriminating a document density through the comparison between the output from sensor 21 and the datum on the document density having been memorized in memory circuit 11; numeral 14 is a copy density control circuit for controlling a density by means of the output from the document density discrimination circuit 13.

Next, an original document detecting operation will be described with reference to FIG. 1 and FIG. 3.

As is obvious from FIG. 3, when the document platen cover 3 is lifted up, the wire 5 is made loose, so that both sensor bar 2 with sensor 21 is situated to the position shown in the figure being energized by means of return spring 8. Thereupon, when a document (in size of B5 for example) is placed onto the prescribed position on a document table and document platen cover 3 is moved down, then the wire 5 is pulled toward the direction of the short dashes line and pulley 9 is thus rotated counter-clockwise resisting the energy of said return spring 8. Further both lever 4 and pulley 9 are arranged so that the detecting operation of sensor 21 can be completed by only slightly pushing down the document platen cover 3. As a result thereof, sensor bar 2 with sensor 21 swivel as indicated by the alternate long and short dash line shown in FIG. 1. At this time, as shown in FIG. 2, the output level of sensor 21 goes up vertically at point G through which the side edge of the document is passed transversely by the reflected light from said document only for the period of time t' after the start of swivelling said sensor bar 2 with sensor 21. In a document discrimination circuit 10 shown in FIG. 5 said period of time t' is compared with the datum of a document size having been memorized in recording circuit 11, and from the time ratio obtained therefrom it can be descriminated that the document is B5 in size. In recording paper selection circuit 12, the recording paper selecting operation is performed in accordance with the output from the document size discrimination circuit 10. The method for selecting a recording paper can be devised variously, and inter alia et exempli gratia, there is given a method therefor in which there are loaded a copying machine with cassettes into which a plurality of recording papers in different sizes are respectively stored. The paper feeding mechanism of the cassette for the proper document size is operated having been discriminated by the document size discrimination circuit 10.

On the other hand, within the period of time t', the document density discrimination circuit 13 discriminates the density of a document by comparing the level of a signal given from a sensor 21 with the datum on a document density memorized in memory circuit 11. Density control circuit 14 controls a copy density properly in accordance with the output from the document density discrimination circuit 13. Various methods for controlling the density are not described herein any more detailedly because they have been known and are not an object of the invention.

Figure 6:
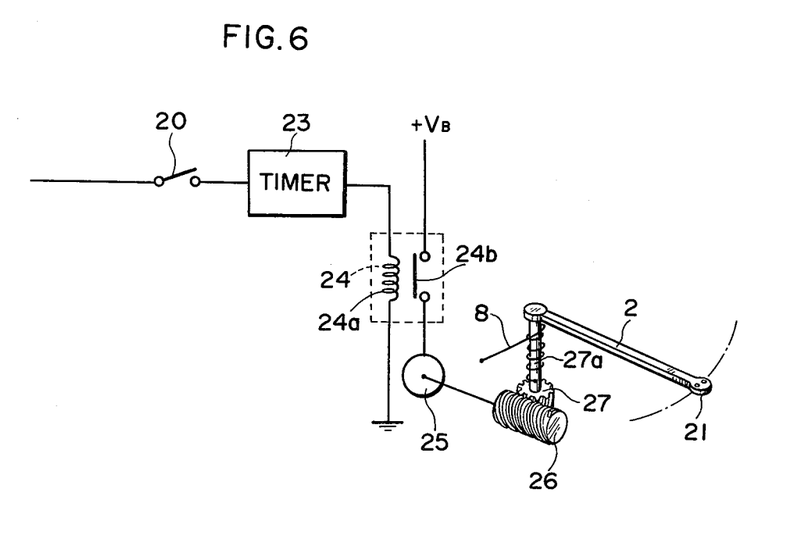
FIG. 6 is another example of the detection member driving mechanism of the present invention.

FIG. 6 illustrates an example of a sensor bar driving mechanism in which an electric circuit is used, wherein, numeral 20 is a micro-switch by which the document platen cover 3 is operated in the direction of making it close and at the same time said switch is switched on; 23 is a timer for giving an "H" level signal for only a certain period of time; 24 is a relay comprising coil 24a and contact point 24b; 25 is a motor; 26 is a worm gear being revolved by motor 25; 27 is a gear engaging with said worm gear 26; and the sensor bar 2 is fixedly mounted to said gear 27 interposingly through shaft 27a. Said shaft 27a is energized clockwise by return spring 8 as similarly shown in FIG. 3.

When a document is placed at the proper position on a document glass table 1 and document platen cover 3 is placed over the document and said cover 3 is slightly operated in the direction of making it close, then micro-switch is switched on and timer 23 generates an "H" level signal for a certain period of time. As a result thereof, coil 24a of relay 24 is energized, so that contact point 24b is made and motor 25 is driven, and thereby both sensor bar 2 and sensor 21 are swivelled counter-clockwise through worm gear 26 and gear 27 resisting the energy of return spring 8. Timer 23 is arranged so as to generate an "H" level signal for the period of time required for sensor bar 2 to scan over the document glass table 1 and for the period of time for the document platen cover to reach the document glass table 1, so that sensor bar 2 is returned to the ordinary position by return spring 8 when sensor bar completes its scan. A size and density of a document are detected for the period of scanning by means of sensor 21 and the methods for detection thereof are as described already referring to FIG. 1, FIG. 2 and FIG. 5.

Figure 7:
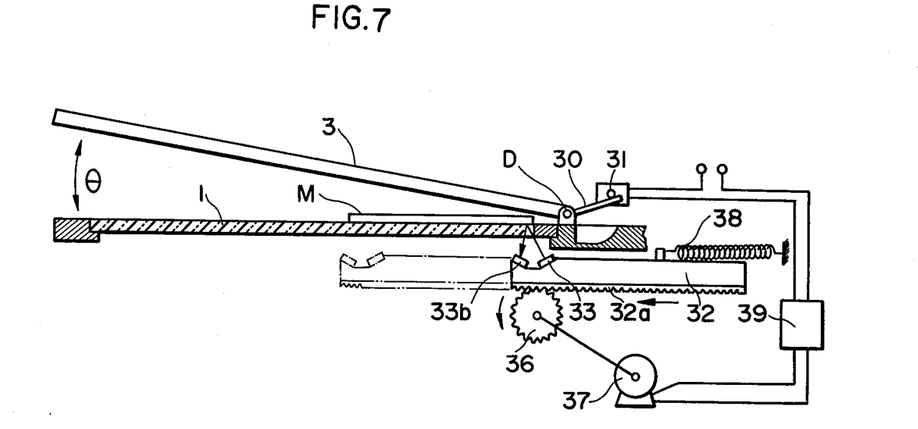
Figure 10:
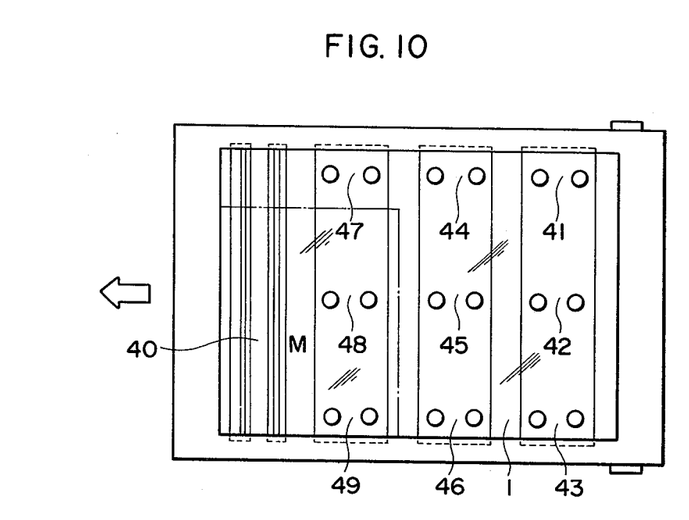

The above-given examples are the ones in each of which a size and density of a document are detected simultaneously by scanning, along the surface of a document glass table, a document having been placed on the document glass table, while the two examples illustrated in FIG. 7 and FIG. 10 respectively are the ones in each of which a size detection only is performed without any detection of a document density.

Figure 8:
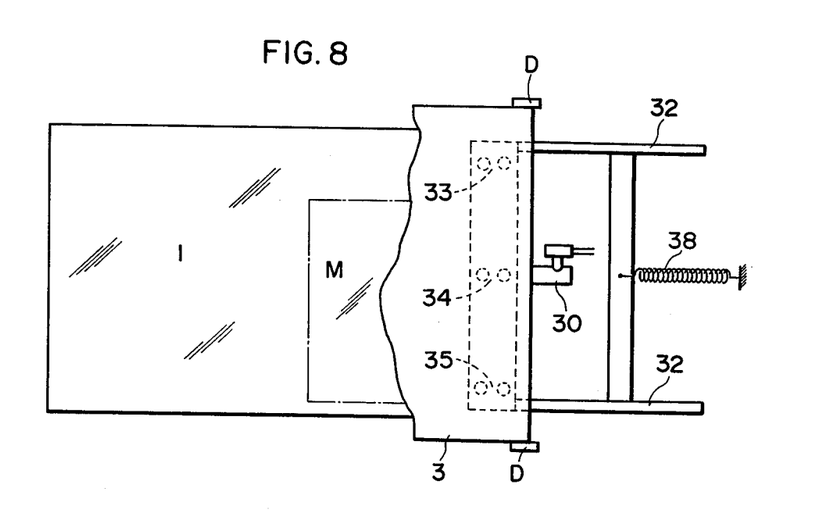

First, the examples illustrated respectively in FIG. 7 and FIG. 8 are of the essential portions of a document size detecting means for a stationary document glass table type electrophotographic copying machine, wherein, lever 30 extending backward is arranged nearly in the center of one side of the document platen cover 3 which is pivotted on fulcrum D and when said platen cover 3 is operated in the direction of making it close, then a micro-switch 31 is simultaneously switched on by said lever 30. On the other hand, a pair of movable plates 32 are provided behind and underneath document glass table 1 and there are provided on the frontal upper surfaces of said movable plates 32 with a series of size detection elements 33, 34 and 35 comprising respectively light emitting element (e.g., 33a) and photoreceptor (e.g., 33b) and on the under surface with rack 32a in the longitudinal direction thereof. Number and positioning of said size detection elements are determined in consideration of the size of document, and in the example shown in the figure there are arranged in series at regular intervals a size detecting element of three pieces, 33, 34 and 35, for detecting the series of A sizes, and two pieces out of which are also designed so as to detect the series of B sizes. Further, a return spring 38 is provided between movable plates 32 to always return backward. Pinions 36 are arranged underneath said movable plates 32 to be engaged with racks 32a of said movable plates 32 respectively, and said pinion 36 is revolvingly driven by motor 37. Numeral 39 is a timer which generates an "H" level signal for a given period of time after micro-switch 31 was switched on.

Now, an arbitrary size of document N (e.g., B5 size) is placed on a document glass table 1 and said document M is pressed by a document platen cover 3. And when the platen cover 3 is operated in the direction of closing it, a micro-switch 31 is on and a motor 37 is then driven to revolve. Consequently, pinions 36 rotate in the direction of the arrow, and movable plates 32 move forward in the direction of the arrow resisting the energy of a return spring 38. In the case of a document of B5 size, each photoreceptor of size detecting elements 34, 35 detects a reflected light from the document M and the output is generated therefrom, while the photoreceptor of size detecting element 33 out of the three pieces thereof does not detect said document M and the output level therefrom is different from those of the above-mentioned two pieces. The state of such output continues for the period of advancing movable plates 32 and at the moment when said movable plates 32 pass on the position indicated by an alternate long and short dash line in FIG. 7, that is, at the moment when size detecting elements 33, 34, 35 pass on the front edge of the document M, the output levels of said size detecting elements 33, 34 and 35 are brought to naught. Therefore, it is possible to detect a document size by the variations of the output levels of these three pieces of size detecting elements 33, 34 and 35 and also by the period of time required to bring every output level to naught. Movable plates 32 advance only for the period having been set by timer 39 and are then returned backward to the original position by return spring 38 because the revolution of motor 37 is stopped in motion when said set period was over. In other words, said movable plates 32 return to evacuate from the underneath of the document glass table 1 so as not to disturb the next exprocess to be continued. Methods for discriminating a document in accordance with the outputs of size detecting elements 33, 34 and 35 are almost the same as that taken in the other example given in FIG. 5, therefore the description thereof is omitted herein.

Figure 9:
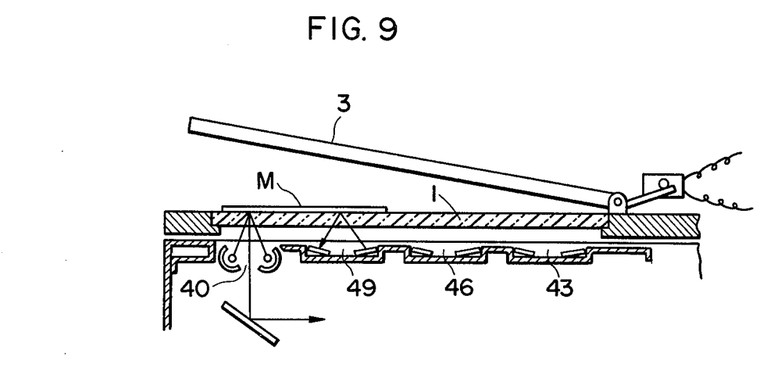

In the example given in FIG. 9 and FIG. 10 respectively, there illustrates the essential portion of a document size detecting means for a moving document glass table type electrophotographic copying machine, wherein numeral 1 indicates a movable document glass table and a document M is placed in a prescribed position on said table. Underneath said document glass table 1, a series of a plurality of the size detecting elements (nine elements in the example) are arranged so as to cover the whole area of said document glass table 1. Each of the size detecting elements comprises a light emitting device and a photoreceptor, and in the respect to the point that the light emitted from a light emitting device is reflected by the rear surface of a document and then received by a photoreceptor, the case given hereby is same as in the case of the other example having already been described. Further, numeral 40 indicates an exposure lamp for a document.

Now, let us indicate nine pieces of the size detecting element as 41–49, respectively, and thereupon in the case of placing a document M as illustrated in FIG. 10, the reflected light from the document M is detected by the size detecting elements 48, 49, while the other size detecting elements do not receive any reflected light, therefore it is possible to discriminate the document sizes from the state of the outputs of a series of nine size detecting elements, and that is same as in the case of the example having already been described.

After the completion of a document size detection, a document glass table 1 moves toward the direction of the arrow, and the exposure and scanning over a document are thus started to operate.

Some examples of the document detecting means of the present invention have been described above, and as for a document glass table surface scanning type thereof it is the matter of course to be allowed to use the types such as those in which a document glass table is scanned separately in the longitudinal direction and in the lateral direction besides the other types as those in which one sensor scans over from one edge to the other of a document glass table as having exemplified before.

As described above, in the present invention, there is provided a document detecting member underneath a transparent document glass table so as to travel along a path given in advance in relation to the document placing positions located on the document table so as to correspond to the sizes of documents respectively and said document detecting member is moved prior to a series of copying operations so that the sizes and the density of documents can be simultaneously detected both or detected either one or the other, and it is therefore possible to detect the size and density of an original document at one time. It is also possible to detect a document size prior to a copying operation because a document detecting means is arranged underneath a transparent document glass table. The present invention has an effect on the elimination of the waste caused by feeding a recording paper of which the size is different from that of a document.

What is claimed is:

1. In a copying machine having a transparent document table on which a document is placed, the improvement comprising a document detecting member arranged beneath said transparent document table to travel along a given scan path in relation to predetermined document placement positions, a sensor on said document detecting member of sensing the presence of a document at any of said document placement positions and generating sensor output corresponding thereto, document size discrimination means for comparing said sensor output with standard document size data stored in memory and generating a document size signal corresponding thereto prior to the copying operation, and recording paper selection means for selecting a proper size recording paper in accordance with said document size signal.

2. The copying machine improvement of claim 1, wherein said sensing means simultaneously senses the density of a document.

3. The copying machine improvement of claim 1 further comprising a platen cover for covering a document on said transparent document table, and means connected to said platen cover for initiating the travel movement of said document detecting member upon a closing movement of said platen cover.

4. The copying machine improvement of claim 3, wherein the document detecting member completes its scan path automatically within a period of time for the platen cover to close over said transparent document table.

5. The copying machine improvement of claim 1, wherein said sensing means comprises a light emitting member and a photoreceptor.

6. The copying machine improvement of claim 3, wherein said platen cover is arranged to swivel around a fulcrum supporting a said frame of said platen cover, and said document detecting member comprises a reflective photosensor for detecting automatically along a scan path in association with a swiveling motion of said platen cover.

7. The copying machine improvement of claim 2 further comprising a document density discrimination means for discriminating a document density by comparing the sensor output with density data stored in memory, and copy density control means for controlling the density of a copying operation by means of an output from said document density discrimination means.

* * * * *